United States Patent [19]
Cardillo et al.

[11] Patent Number: 6,080,963
[45] Date of Patent: Jun. 27, 2000

[54] TOASTER OVEN WITH AUTOMATIC FEED

[75] Inventors: Alfredo Cardillo, Roseville; Donald M. Lawrence, Redford Township, both of Mich.

[73] Assignee: Prodesign Technology, Inc., Roseville, Mich.

[21] Appl. No.: 09/373,475

[22] Filed: Aug. 12, 1999

[51] Int. Cl.[7] .................................................. F27B 9/06
[52] U.S. Cl. ......................... 219/388; 219/391; 219/395; 99/329 RT
[58] Field of Search ................................ 99/329 RT, 386, 99/335, 331, 341; 219/388, 492, 391, 395, 413, 497, 400

[56] References Cited

U.S. PATENT DOCUMENTS

| | | |
|---|---|---|
| D. 111,765 | 10/1938 | Hadley . |
| D. 144,870 | 5/1946 | Platkin . |
| D. 237,242 | 10/1975 | Claxton . |
| D. 304,147 | 10/1989 | Takada et al. . |
| D. 401,472 | 11/1998 | Gould . |
| D. 413,040 | 8/1999 | Lawrence et al. . |
| 1,536,538 | 5/1925 | Stouffer . |
| 1,555,336 | 9/1925 | Vaughan . |
| 1,678,337 | 7/1928 | Halifax . |
| 2,014,595 | 9/1935 | Simmons . |
| 4,044,660 | 8/1977 | Montague et al. . |
| 4,404,898 | 9/1983 | Chaudoir ................................. 99/331 |
| 4,488,480 | 12/1984 | Miller et al. ............................ 99/386 |
| 4,503,758 | 3/1985 | Carville .............................. 99/329 RT |
| 4,510,376 | 4/1985 | Schneider ............................... 219/492 |
| 4,945,212 | 7/1990 | Gogan et al. .......................... 219/388 |
| 5,473,975 | 12/1995 | Bruno et al. ............................. 99/335 |
| 5,686,004 | 11/1997 | Schneider ............................... 219/388 |
| 5,746,116 | 5/1998 | Smith ....................................... 99/386 |
| 5,821,503 | 10/1998 | Witt ........................................ 219/388 |
| 5,839,354 | 11/1998 | Cardillo ............................ 99/329 RT |

OTHER PUBLICATIONS

Hatco brochure, *The Innovators of Food Service Equipment*, Form No. HP–2095 (12 pp.).
KitchenAid® Toasters brochure (1 p.).
Cuisinart® toasters brochure, pp. 23–24.
*Tostadas Con Alessi*, Philips by Alessi.
Williams–Sonoma Catalog, *Dualit Toaster*, p. 74.
Williams–Sonoma Catalog, *Commercial Pizza Oven*, p. 81.
Picture of Philips toaster.
*Toasters* (3 pp.).
Toastmaster, *Factory Outlet* (1 p.).

*Primary Examiner*—Teresa Walberg
*Assistant Examiner*—Leonid Fastovsky
*Attorney, Agent, or Firm*—Harness, Dickey & Pierce, P.L.C.

[57] ABSTRACT

A toaster for everyday household use includes a conveyor which carries items to be toasted past electrical heating panels. The toaster has an entrance wherein the items are inserted horizontally from a feed tray onto the conveyor. The feed tray being a cover for the entrance way, when the toaster is not in use, automatically opens to become a feed mechanism which closes after the item to be cooked has entered the toaster. The apparatus further has another door which functions as a cover for the exit hole of the toaster which automatically opens to dispense the cooked food item upon the end of a cooking cycle.

15 Claims, 6 Drawing Sheets

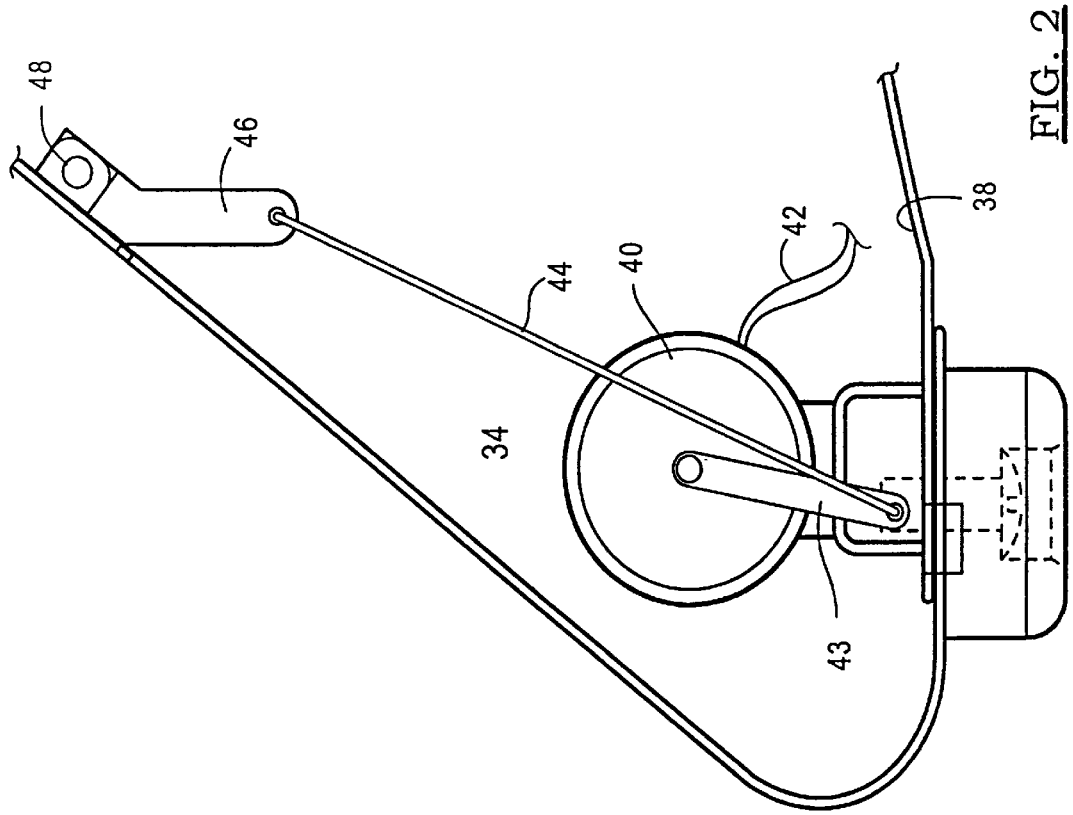

TOASTER OVEN WITH AUTOMATIC FEED

BACKGROUND AND SUMMARY OF THE INVENTION

1. Technical Field

This invention relates in general to household kitchen appliances, and more particularly to electric appliances used to make toast, such as toasters and toaster ovens.

2. Discussion

Conveyor ovens typically include an oven housing, a heat source within the housing, and a conveyor configured to move food products through the oven, whereby the food products are heated or toasted by the heat source. The use of an endless conveyor to move food products through the oven typically increases the processing capacity of conveyor ovens over other types of ovens. The degree to which food products are heated depends on the temperature within the conveyor oven and the time period during which food products are heated (which is a function of conveyor speed). Thus, to control the degree of heating, conveyor ovens typically provide operator controls configured to adjust the oven temperature or conveyor speed.

Different types of conveyor ovens are known. For example, conveyor toasters are commonly used to toast food products including bread, buns, bagels, muffins and waffles. These conveyor toasters, which include both vertical and horizontal models, include a toaster housing, electric heating elements mounted within the toaster housing, and an endless conveyor which moves food products adjacent to the heating elements such that the food products are toasted. The food products can be placed directly on the conveyor of a horizontal toaster oven, or can be held within a food-carrying basket of either a vertical or horizontal toaster oven. Food products are manually loaded through an opening in the housing, are toasted as they are moved past the heating elements by the endless conveyor, and are discharged into a product receiving tray located at the bottom of the housing.

Other types of conveyor ovens for processing food products include, for example, conveyorized pizza ovens, microwave ovens and tunnel ovens. Control over the degree of heating in each type of conveyor oven is typically accomplished by varying the oven temperature or the conveyor speed. Although the description below is focused on toaster conveyor ovens, the term "conveyor oven" is intended to include other conveyor oven types.

In some conveyor ovens, conveyor speed is controlled by an operator using a variable-resistance device (e.g., a rheostat). The rheostat forms part of a speed control circuit which controls the speed of an AC electric motor driving the conveyor via gears. The degree of toasting is set by appropriate adjustment of the rheostat. An increase in resistance causes the speed control circuit to decrease the conveyor speed, thereby increasing the degree of toasting. Conversely, a decrease in resistance of the rheostat causes an increase in conveyor speed, thereby decreasing the degree of toasting. The operator adjusts the rheostat setting such that the food product being processed is properly heated or toasted.

Despite having control circuits for controlling the conveyor speed and heating elements, such conveyor ovens are unable to control the degree to which food products are heated under certain conditions. For example, assume a speed control circuit is adjusted to lightly toast a given load of food products. If the conveyor drive moves too quickly; it will not be possible to toast the product properly because the food product will spend too much time by the doors or for instance if a large item is placed on the conveyor. During this period, food products being processed will receive an insufficient amount of heat energy and will be undercooked.

Attempted solutions to this problem have been to increase the power of the additional heating elements or to switch on more heating elements using the thermostat. These solutions, however, have several drawbacks. First, the higher power ratings or additional heating elements increases the cost of the ovens. Second, the additional power can result in over-heating or burning the products. Third, longer cooking times require a longer conveyor to move the product away from the input and output openings, thus increasing the cost and size of the toaster.

Accordingly, it would be advantageous to provide an improved feeding mechanism and speed control circuit for a conveyor oven. It would be advantageous to provide a feeder mechanism that automatically places the food onto the conveyor. It would further be advantageous provide a feeder and discharge mechanism which will automatically function to handle the food products and act a door for the toaster oven. It would also be advantageous to provide a simplified conveyor speed control circuit having decreased complexity, lower costs and increased reliability compared to computerized control circuits.

A main object of the present invention is to provide an electrical apparatus that allows one to insert bread slices into a feeder mechanism, which automatically opens during the first stage of a toasting sequence.

While a further object of the present invention is to provide a toasting apparatus that has a bigger access opening for communicating with other toaster items generally larger than a slice of bread. These items may include pizza rolls or dinner buns.

Still another object of the present invention is to provide a trip mechanism for starting the apparatus, and for alerting one that the toasting cycle has been completed and the apparatus has shut itself off.

Another object of the present invention is to provide a timer for use with placing the oven rack in a fixed position while stationary baking is needed.

In light of the foregoing problems with common household toasters, and to fulfill the above-stated objects, there is provided, according to one aspect of the present invention, a new and improved household toaster which utilizes a segmented conveyor for carrying items to be toasted through opposing upper and lower heating filaments. The toasted items are then discharged through an exit in the side of the device.

A first embodiment of the present invention comprises a generally trapezoidally shaped shell having a door at the forward wall area. Located at the side walls are a first opening, for inserting slices of bread, and a second opening for receiving the slice once the toasting cycle has been completed. (The first and second openings, include doors. The doors function as feeder and discharge mechanisms.)

A segmented chain conveyance mechanism, driven by sprocket axle attached to an electric motor, supports the items to be toasted and has an electronic controller for determining the conveyor speed. The slower the conveyor speed the longer the items remain between the heating filaments. This provides flexibility in the unit to provide longer cycle times for providing well done items or where longer cooling times per item is required. The control dial or electronic controller also regulates the timing and movement of the feeder and discharge mechanisms.

Also located along the front surface of the toaster is a timer and clock. The timer is activated by a dial which controls the conveyor speed. The clock is a convenience item for the user.

Extending from the rearward wall of the toaster of the present invention is a drive assembly. The assembly is electrical and runs on 110 volt household current. The assembly further comprises a variable speed electric motor housed in a separate shell to prevent toast debris from infiltrating the are a. Extending from the motor compartment, and transversing the conveyor segments, is a drive axle having sprockets which communicate with the individual conveyor segments to propel the assembly.

BRIEF DESCRIPTION OF THE DRAWINGS

In the drawings where like reference numerals are used to indicate identical components in the various figures:

FIG. 2 is an enlarged view of the feeder mechanism of a preferred embodiment of the present invention as shown in FIG. 1;

DETAILED DESCRIPTION OF THE PREFERRED EMBODIMENT

Figure 1:
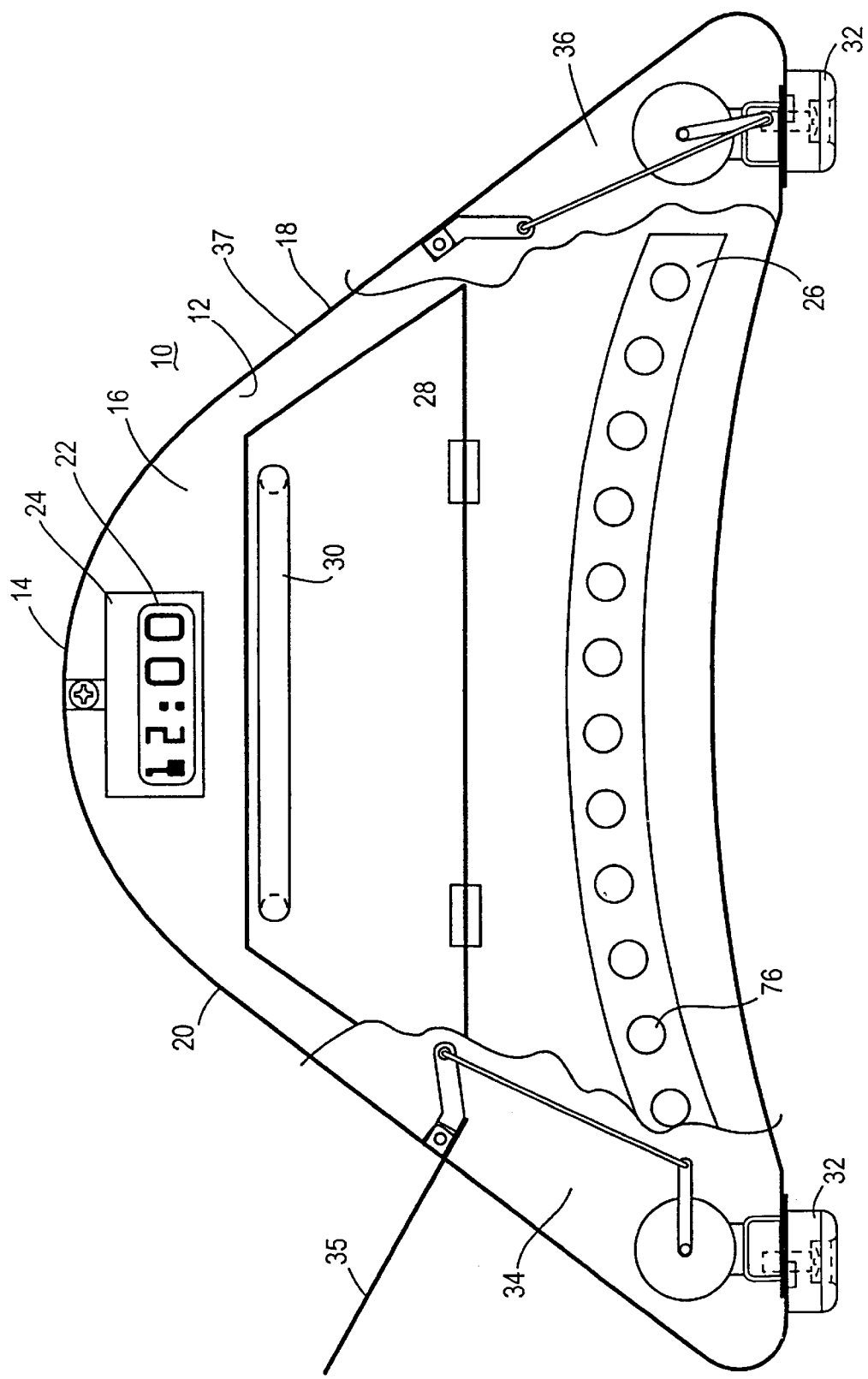
FIG. 1 is a partially cut away front view of a preferred embodiment of the present invention.

With combined reference to all the figures, a conveyor toaster is generally denoted by the numeral 10. As seen in FIG. 1, the toaster 10 has a generally trapezoidally shaped body 12. The body 12 has a top surface area 14, a frontal wall 16, and side walls 18, 20. Located in the front wall 16 of the appliance 10 is a display 22, controller 24, control panel 26 and a hinged translucent door 28 having a handle 30 for opening and closing. The door 28 and handle 30 allow one access to toasted objects when the toaster is baking in a stationary position. Further shown are feeder mechanism 34 having a feeder tray 35, and discharge mechanism 36 having discharge tray 37. The entire assembly 10 is supported by a series of resilient pads 32 which control slippage and shock upon placement upon any normal planar surface.

As seen in FIG. 2, the feeder mechanism 34 is mounted to a unitary base 38 and further comprises a feeder mechanism electric motor 40 and motor arm 43 having an electricity supply line 42. It is contemplated that an appropriate step down gear set can be disposed between the motor 40 and the motor arm 43. The motor arm 43 is mounted on one end to the feeder mechanism electric motor 40 and to its other end to link 44. Link 44 is mounted at its other end to door arm 46. Door arm 46 is pivotally mounted at pivot point 48 to side wall 20 and is further coupled to tray 35.

Figure 3B:
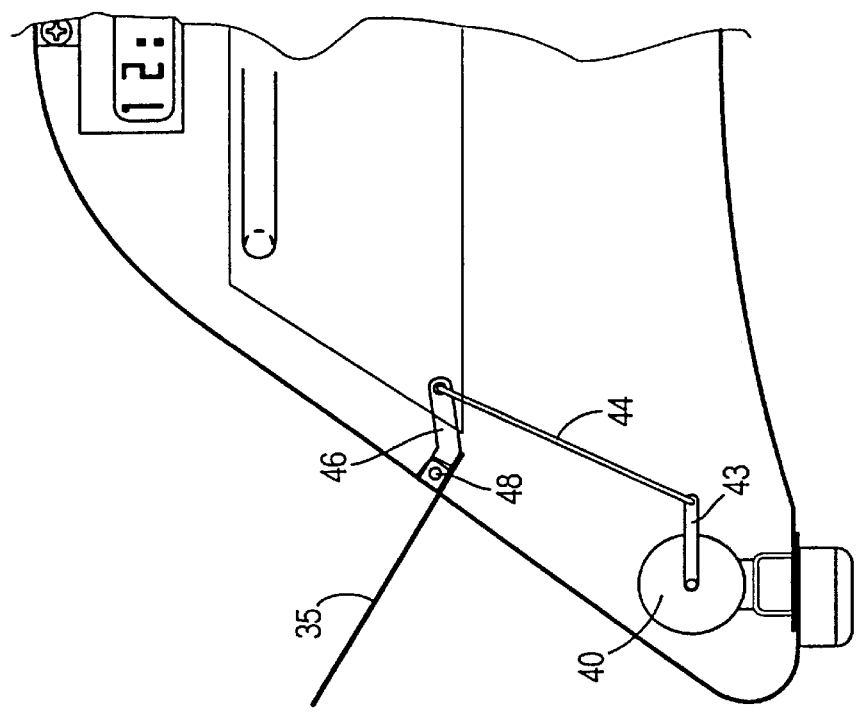
FIG. 3b is a frontal cut-away view, of a preferred embodiment of the present invention showing the functioning of the feeder mechanism.
Figure 3A:
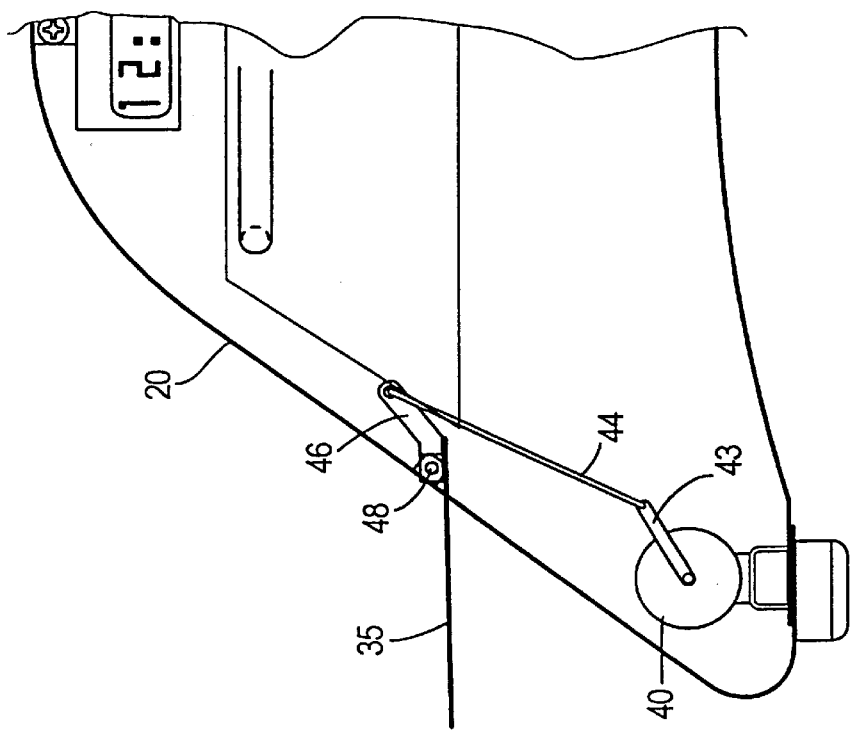
FIG. 3a is a frontal cut-away view of a preferred embodiment of the present invention showing the functioning of the feeder mechanism.

FIG. 3a shows the starting position of the toaster 10 in its preferred embodiment. Tray 35 is shown in its fully opened position. Feeder mechanism motor 40 is shown as having rotated motor arm 43, which has in turn displaced link 44. Door arm 46 is shown pivoted about pivot point 48 to open tray 35 to its loading position. FIG. 3b shows tray 35 in its feed position. Feeder mechanism motor 40 is shown as having rotated motor arm 43 slightly and thus translating link 44. In this position, bread which is on tray 35 may be fed onto conveyor assembly 50 (shown in FIG. 4).

After the bread is baked or toasted, conveyor assembly 50 moves the bread to the other side 18 of the toaster 10 and discharges it onto tray member 37. As seen in FIG. 3c, the discharge mechanism 36 has a similar construction as the feeder mechanism 34. The discharge mechanism 37 is illustrated as having a discharge mechanism motor 52 connected to a motor arm 54. The motor arm 54 is connected to link 56 which is in turn connected to door arm 58. The door arm 58 is pivotally mounted by pivot pin 60 to the toaster side 18 for pivotally mounting the tray 37.

Figure 3D:
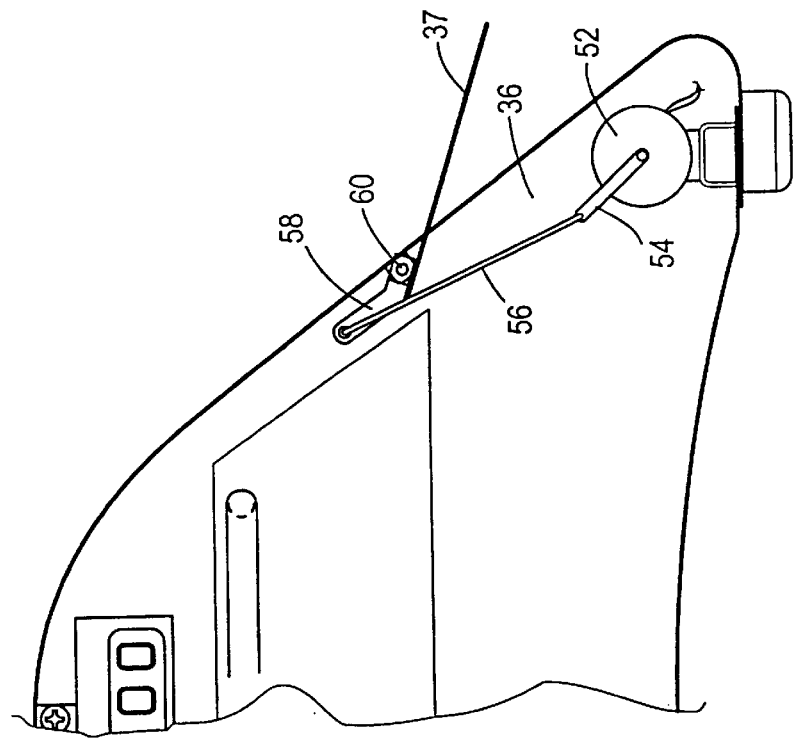
FIG. 3d is a frontal cut-away view, of a preferred embodiment of the present invention showing the functioning of the discharge mechanism.
Figure 3C:
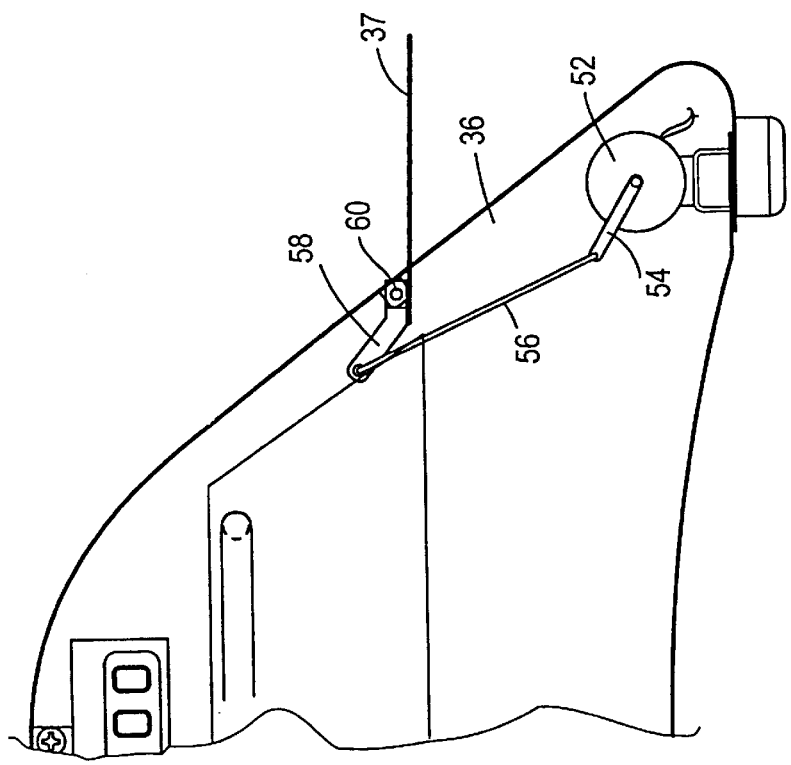
FIG. 3c is a frontal cut-away view, of a preferred embodiment of the present invention showing the functioning of the discharge mechanism.

FIG. 3d shows the further rotation of discharge mechanism motor 52 and corresponding links allowing for tray 37 to be positioned in its plate or discharge position.

Figure 4:
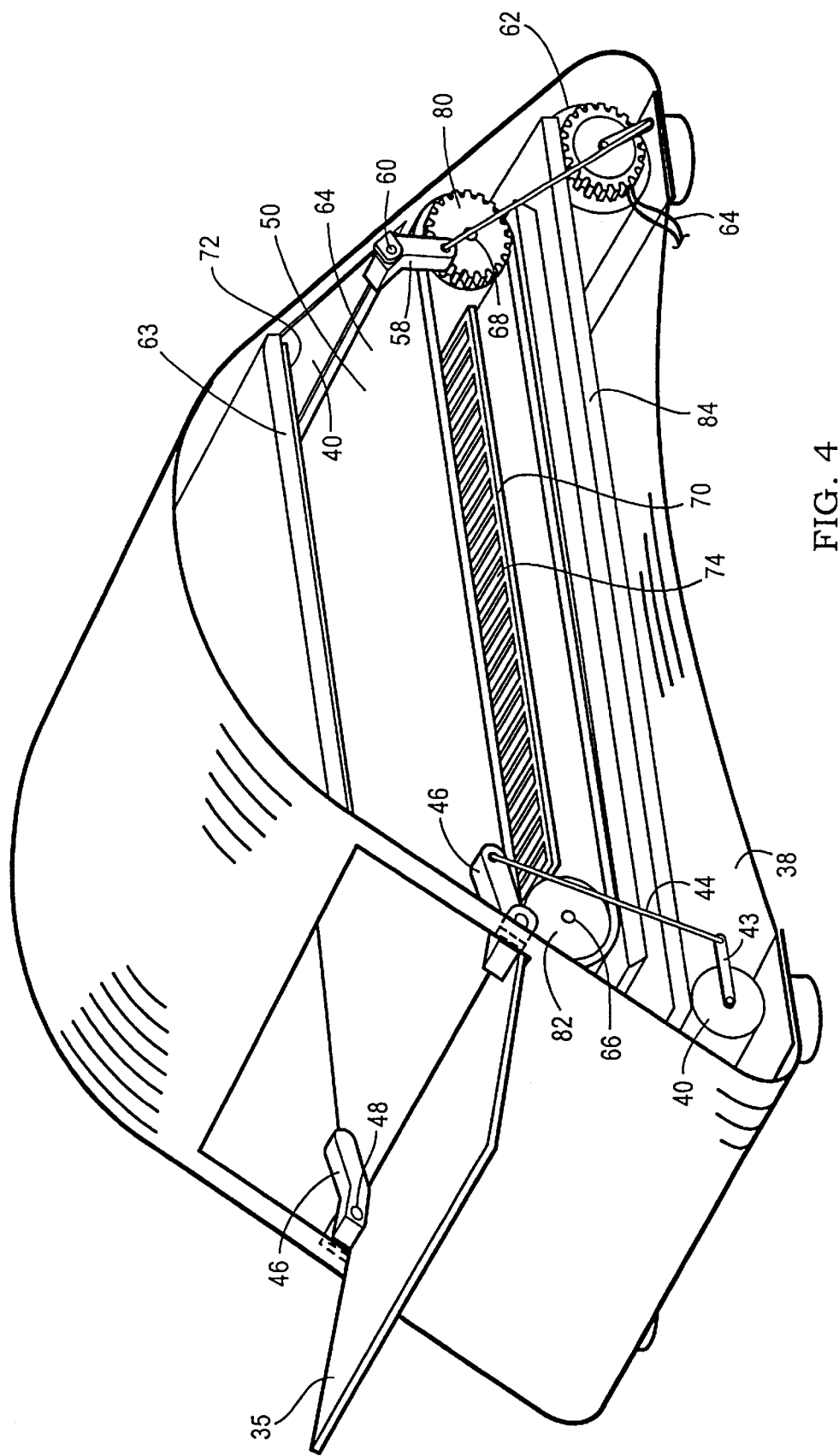
FIG. 4 is a cut-away perspective view of the drive mechanism of a preferred embodiment of the present invention.

As seen in FIG. 4, the unitary base 38 further comprises a conveyor assembly 50 which is driven by an electric motor 62 having an electrical supply line 64. The conveyor assembly 50 has a series of chain linked segments 64 (detail not shown) which are held in a fixed rotation by opposing axles 66 and 68. The drive axle 68 is propelled by the motor 62. Heating panels 70 and 72 are laced with electrical filaments 74. The panels 70 and 72 are mounted to the toaster by tabs (not shown).

As best seen in FIG. 1, the conveyor assembly 50 is controlled by a controller 24 which receives input from control panel 26. The controller 24. is used to increase, or decrease, the speed of the conveyor 50 thereby determining the duration the slice of bread or other food item spends being toasted. The control panel 26 has a plurality of buttons 76 for controlling the operation of the toaster. It is preferred that these buttons control operations such as opening and closing the feeder and discharge mechanism as well as setting the toasting time. Preprogrammed times are also available by pressing one of the plurality of buttons. Coupled to the controller 24 is display 22. The controller 24 being able to transmit greetings to the display 22 upon the opening of the toaster 10 as well as displaying the amount of toasting time left in a particular cycle. In a situation where a preselected cycle is chosen, the cycle chosen can be displayed along with the amount of time left in the toasting cycle. The controller 24 allows functions such as setting the clock or using the display as a countdown timer. The controller 24 is also able to perform more complex tasks such as adjusting the temperature of the heating coils 70, 72 to a low for a first thaw cycle and then a second cook cycle thereafter.

Figure 5:
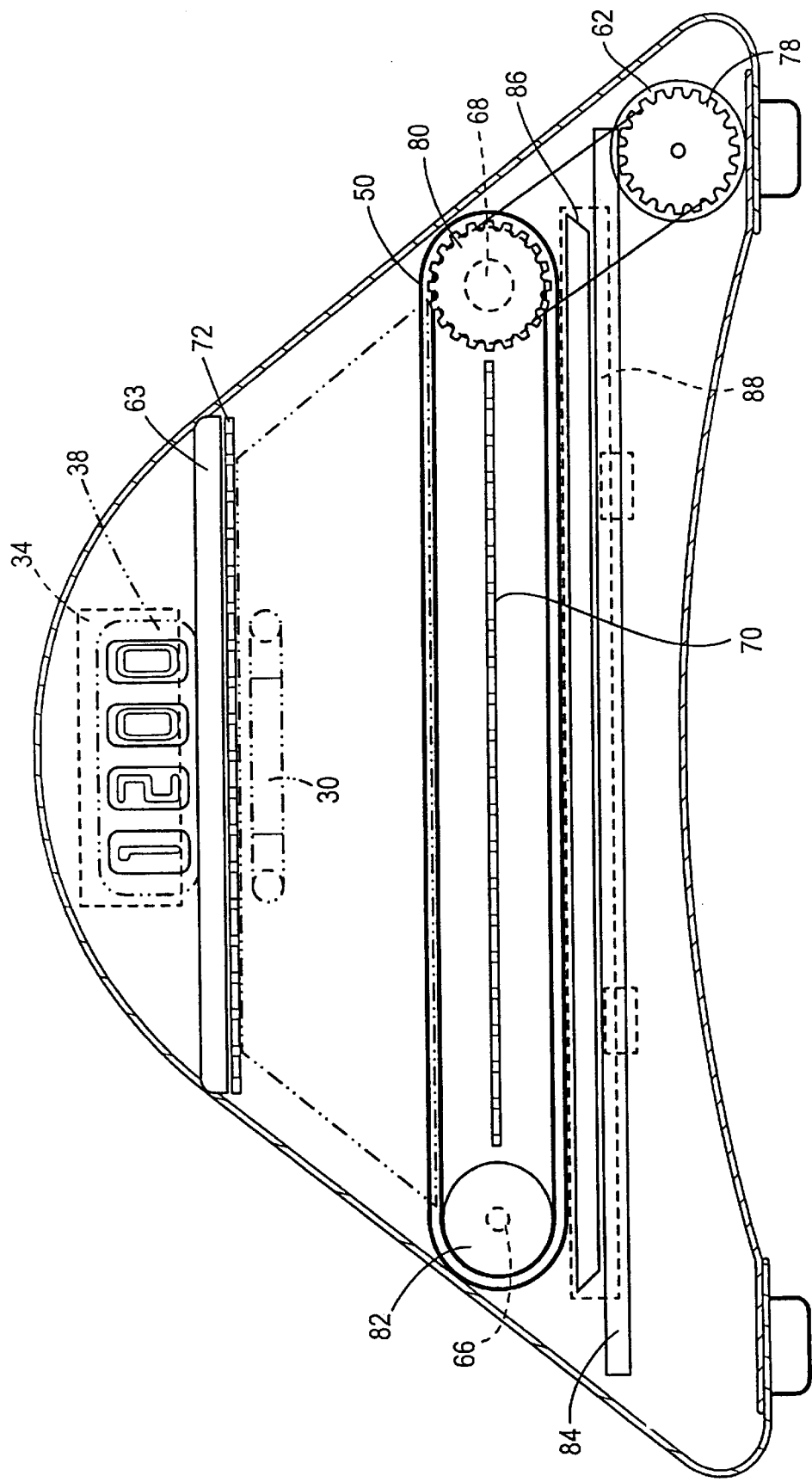
FIG. 5 is a cross-sectional front view of a preferred embodiment of the present invention.

As seen in FIG. 5, coupled to belt drive motor 62 is drive belt gear 78. Coupled to drive shaft 68 is drive belt gear 80. The drive belt gear 80 being coupled to drive belt gear 78 by a chain. Further shown in FIG. 5 is an idler 82 mounted to shaft 66 for maintaining the proper tension on conveyor belt 50. Disposed between conveyor 50 and insulating layer 84 is the chrome tray 836. The assembly 10 has a hinged door 88 on the back of the toaster 10 for accessing the chrome tray 86.

During operation of the toaster, controller 24 functions to open the first tray 35 into its loading position. After a predetermined amount of time, the door 35 is rotated about hinge 48 into its loading position. In this position, the food slides down tray 35 and engages the chain conveyor 50. Controller 24 activates the conveyor drive motor 62 while simultaneously raising tray 50. This functions to place the food onto the conveyor 50 and to close the tray 35. Once the conveyor 50 has rotated a predetermined distance, the conveyor 50 will stop, allowing the food to cook. After a predetermined amount of time, the conveyor 50 will restart. Simultaneously, the second tray will begin to open as the controller 24 sets the exit tray 37 in its discharge position. Electric current to the heating coils 76, 72 at this time is stopped.

Additionally, the electronic controller 24 has a feature which maintains the conveyor in a stationary position while still allowing the user the ability to have a timed cook. This feature would be useful when items requiring more cooking time are desired. In this situation, the user simply lowers the translucent door 78 and inserts the item directly onto the oven conveyor 50.

While the foregoing embodiments of the present invention are well suited to achieve the above stated objects, those skilled in the art to which it pertains, should realize that such embodiments are subject to modification and change without departing from the scope or spirit, of the present invention. For example, other door opening mechanisms could be used to open the doors of the appliance. The wire mesh, being segmented, would communicate with the chain linked segments to prevent the cooked food from falling onto the heating panels. In still another example, the appliance could be expanded proportionately for use in commercial enterprises.

Other variations will no doubt occur to those skilled in the art upon the study of the description and drawings contained herein. Accordingly, it is to be understood that the present invention is not limited to the specific embodiments described herein, but should be deemed to extend to the subject matter defined by the appended claims, including all fair equivalents thereof.

What is claimed is:

1. An electrical household toasting appliance comprising:
    a conveyor for transporting food items through the appliance from an entrance to an exit;
    a first tray member mounted by hinges from the entrance and which supports the food items as they enter the appliance;
    a second tray member which is mounted by second hinges from the exit and supports the food items as they exit the appliance;
    an electric motor assembly adapted for rotational communication with the conveyor;
    a plurality of heating elements connected to an electrical supply; and
    at least one mechanism for rotating at least one of the first and second tray members comprising:
    a first electric motor; and
    a first pivot linkage driven by the first electric motor.

2. The appliance as described in claim 1 wherein, the appliance further comprises:
    a body, having a hinged door member having a translucent panel for viewing the food item, wherein a handle extends outwardly from a top portion of the translucent panel for manipulation of the door member thereof.

3. The appliance as described in claim 1 wherein the first pivot linkage comprises:
    a first motor arm having two ends, one end mounted to the first electric motor, its other end mounted to a first link;
    the first link being mounted to a first door arm, the first door arm being pivotally mounted by a first pivot pin to the appliance and further mounted to one of the first and second tray members.

4. The appliance of claim 1 further comprising:
    a second electric motor; and
    a second pivot linkage comprising:
    a second motor arm having two ends, one end mounted to the second electric motor, its other end mounted to a second link;
    the second link being mounted to a second door arm, the second door arm being pivotally mounted by a second pivot pin to the appliance and further mounted to the other of the first and second tray members.

5. The appliance as described in claim 4 wherein, the heating panels are displaced above and below passing food items for toasting opposing surfaces thereof.

6. An electrical household toasting appliance comprising:
    a base member;
    a body member fastened to said base member, said body member having a generally trapezoidal shape, a plurality of side walls and an entrance and an exit on opposite longitudinal ends thereof;
    a conveyance assembly for transporting food items through said body member from said entrance to said exit at a speed;
    a plurality of planar tray members each hinged at one end extending from each of said entrance and said exit;
    a control means for adjusting said speed of said conveyance assembly;
    a plurality of heating elements; and
    at least one mechanism coupled to at least one of the plurality of tray members for rotating at least one of the tray members about its hinge comprising an electric motor and a pivot linkage.

7. The appliance of claim 6, further comprising a door member having hinged to said body member and having a translucent panel therein for viewing within the body member.

8. The appliance of claim 6, wherein said conveyance assembly comprises:
    a electric motor assembly having an axle member extending crosswise of conveyor and adapted for rotation;
    a plurality of chain linked segments extending along the longitudinal axis of the appliance;
    a drive axle extending through the center of the chain linked segments being supported at one end by a first tab portion extending from the base member and supported and driven at an opposite end by the motor assembly;
    a plurality of toothed sprockets, each being fixed to the drive axle and each being co-operable with one of the plurality of chain linked segments; and
    a plurality of undriven axles each being supported at one end by a first tab portion and supported at a second end via a second tab portion.

9. The appliance of claim 6 wherein, the control means comprises:
    a control panel disposed on said body having a plurality of switches, said control panel comprising means for setting the speed of the conveyance assembly and a timer.

10. The appliance of claim 6 wherein, the heating elements are located both above and below the conveyance assembly.

11. The appliance of claim 6 wherein the pivot linkage comprises an arm having two ends, one end mounted to the motor, its other end mounted to a link; the link mounted to a door arm, the door arm pivotally mounted by a pivot pin to the appliance and further mounted to at least one of the planar tray members.

12. The appliance of claim 6 wherein, the control means for adjusting the speed of the conveyance assembly comprises a plurality of control buttons and a display.

13. The appliance as described in claim 12 wherein the plurality of planar tray members function as doors covering the entrance and exit of the appliance; and wherein one of said plurality of control buttons functions to either open or close at least one of the planar tray members and wherein the display displays a greeting upon the opening of the at least one of the planar tray members.

14. The appliance of claim 13 wherein at least one of the control buttons regulates the speed of the conveyance assembly; and wherein said display displays the amount of time the toaster is operational.

15. An electric household toasting appliance comprising:
- a chain conveyor for transporting food items through the appliance from an entrance to an exit;
- a first planar tray member having a handle, being mounted by hinges adjacent the entrance, which supports the food items as they enter the appliance;
- a first mechanism for rotating the first planar tray member which comprises a first electric motor, a motor arm having two ends, mounted at one end to the motor and at the second end to the first planar tray member;
- a second planer member having a handle, being mounted by hinges adjacent the exit which supports the food items as they leave the appliance, a second mechanism for rotating the second planar tray member which comprises a second electric motor, a second motor arm having two ends, the first end of the second motor arm being attached to the second electric motor and the second end of the second motor arm being attached to the second planar tray member;
- a plurality of heating elements being disposed substantially parallel to the chain conveyor;
- a translucent door having a handle being attached by at least one hinge to the appliance;
- a controller operatively connected to the conveyor and the first and second motors for controlling the opening and closing of the first and second planar tray members.

* * * * *